United States Patent

[11] 3,567,932

[72] Inventor James R. Alburger
5007 Hillard Ave., La Canada, Calif. 91011
[21] Appl. No. 711,105
[22] Filed Mar. 6, 1968
[45] Patented Mar. 2, 1971
Continuation-in-part of application Ser. No. 492,674, Oct. 4, 1965, abandoned,
Patent No. 3,386,920,
Continuation-in-part of application Ser. No. 323,529, Nov. 13, 1963, abandoned,
Continuation-in-part of application Ser. No. 149,061, Oct. 31, 1961, abandoned,
Continuation-in-part of application Ser. No. 82,374, Jan. 13, 1961, abandoned.

[54] FLUORESCENT TRACER PROCESSES EMPLOYING A FLUORESCENT EUROPIUM CHELATE
2 Claims, 3 Drawing Figs.
[52] U.S. Cl. .................................................. 250/71,
73/104, 252/301.2R, 260/429J
[51] Int. Cl. .................................................. G01n 21/16,
G01n 21/38; C09k 1/00
[50] Field of Search .......................................... 252/301.2,
301.3; 250/71 (T); 331/94.5

[56] References Cited
UNITED STATES PATENTS

| 3,214,382 | 10/1965 | Windsor | 252/301.2 |
|---|---|---|---|
| 3,225,307 | 12/1965 | Weissman | 331/94.5 |
| 3,367,910 | 2/1968 | Newing | 260/46.5 |
| 3,377,292 | 4/1968 | Halverson | 252/301.3 |
| 3,388,071 | 6/1968 | Nehrich et al. | 252/301.2 |
| 3,398,099 | 8/1968 | Kleinerman | 252/301.2 |
| 3,440,173 | 4/1969 | Hovey et al. | 252/301.2 |
| 3,450,641 | 6/1969 | Schimitscher et al. | 252/301.2 |
| 3,360,478 | 12/1967 | Schimitscher et al. | 252/301.2 |
| 2,871,697 | 3/1959 | Sockman | 73/104 |
| 3,028,338 | 4/1962 | Parker | 252/301.2 |

OTHER REFERENCES
COLLAT et al. Anal. Chem., 27(1955), p. 961— 5

Primary Examiner—Tobias E. Levow
Assistant Examiner—A. P. Demers

ABSTRACT: An inspection process and inspection tracer compositions which utilize fluorescent coordination compounds dissolved in liquid or resinous carriers. The fluorescent metal-organic coordination compounds provide unique effects of transparency to white light along with novel characteristics of fluorescent color. The tracer compositions disclosed may be utilized for the detection of surface defects in parts, as display elements (image-forming screens), or as marking materials.

PATENTED MAR 2 1971 3,567,932

INVENTOR.
James R. Alburger

FLUORESCENT TRACER PROCESSES EMPLOYING A FLUORESCENT EUROPIUM CHELATE

The present application is a continuation-in-part of my copending application, Ser. No. 492,674, filed Oct. 4, 1965, now Pat. No. 3,386,920 issued Jun. 4, 1968, for PROCESS FOR FLUORESCENCE DETECTION OF EXTREMELY SMALL FLAWS, issued as U.S. Pat. No. 3,386,920, now Reissue No. Re-26,888, which latter application was a continuation-in-part of my application, Ser. No. 323,529, filed Nov. 13, 1963, for FLUORESCENT TRACERS, which other application was a continuation-in-part of my application Ser. No. 149,061, filed Oct. 31, 1961, for FLUORESCENT TRACERS, which last application was a continuation-in-part of my application, Ser. No. 82,374, filed Jan. 13, 1961, for FLUORESCENT PENETRANT TRACERS. The present invention relates to fluorescent tracers which exhibit fluorescence response in relatively thin films, and, more particularly, to a method of preparing ultraviolet-responsive fluorescent tracers utilizing fluorescent metal-organic coordination compounds as ultraviolet-responsive ingredients.

Fluorescent tracers are well-known in the prior art, and have usually been comprised of one or more fluorescent dyes dissolved in a suitable carrier material. These tracers have found advantageous usage in industrial inspection processes. Thus, such tracers have been employed in the detection of surface flaws in parts constructed of metal, ceramic, or other material. When used for this purpose, the fluorescent dye and carrier is utilized in the form of a penetrant liquid which forms entrapments in the flaws and renders the latter more readily detectable than might be the case with ordinary visible colored dyes.

Fluorescent tracers are also employed in the form of solutions of fluorescent indicator dyes in thin layers of plastic or resinous materials, and such materials may be used in the construction of ultraviolet-responsive image-forming screens, as set forth in my now-issued Pat. No. 3,320,417, granted May 16, 1967, for FLUORESCENT IMAGE-FORMING SCREEN, or as controlled concentrations of fluorescent dyes in liquid, plastic, or resinous materials, for purposes of adjusting and controlling the thickness of applied films of material in accordance with the tee method of my now-issued Pat. No. 3,341,706, granted Sept. 12, 1967, for METHOD OF CONTROLLING THE THICKNESS OF APPLIED LIQUID FILMS USING DYE TRACERS.

In my copending application, Ser. No. 492,674, of which this application is a continuation-in-part, I have pointed out that in the use of fluorescent penetrants for detection of extremely small flaws, it has heretofore been thought that the ability of the tracer to detect the flaws is a function of its fluorescent brightness. Basically, fluorescent brightness, of course, depends upon the particular fluorescent dye or dyes used. However, such brightness can be enhanced by the well-known effect of "cascading of fluorescence." Whereas the brightness effects produced by combinations of two or more fluorescent dyes are ordinarily approximately additive, cascading involves the transfer of radiant energy from one dye component to another, with a consequent increase in brightness which is more than merely additive.

Since, as has been pointed out, the sensitivity of a fluorescent substance as regards its ability to reveal its presence in microtraces has been equated with fluorescent brightness, it has often been the practice in industrial inspection processes to attempt to maximize such sensitivity of the fluorescent tracer used by increasing the fluorescent brightness thereof; e.g., through the use of the aforementioned effect of cascading of fluorescence. Thus, when a flaw and its tracer entrapment are so small as to be virtually invisible under black light, it has usually been felt necessary to employ a tracer of increased fluorescent brightness so as to make the flaw detectable. However, in spite of the attempts heretofore made to maximize the sensitivity of fluorescent penetrant materials by increasing the fluorescent brightness thereof, presently known fluorescent penetrant tracers are unable to detect extremely small flaws which may result from such effects as intercrystalline corrosion or "creep cracks," and which may have dimensional magnitudes on the order of $10_{-5}$ to $10_{-6}$ centimeters.

Failure in the prior art to produce fluorescent tracers which are able to detect flaws of such small dimensional magnitude has resulted primarily from the emphasis which has been laid on the fluorescent brightness of the particular dyes employed, as discussed above. Furthermore, it should be noted tat in the design of fluorescent tracer liquid compositions in the past, attention has been concentrated on usage of fluorescent dyes or dye-type materials, without any consideration being given to possible advantages to be gained through use of nondye materials, such as fluorescent metal-organic coordination compounds.

I have found that in certain kinds of fluorescent materials, known as coordination compounds, many of such materials do not appear to suffer from the effects of self-quenching of fluorescence in high concentrations. In addition, I have found that certain of such materials exhibit unique and desirable properties of color, transparency, stability, and dimensional sensitivity, as well as low cost, when they are utilized in appropriate solvent carriers, or in resinous carriers as image-forming screens, or as finely ground powders for usage as fluorescent pigments.

The principal object of the invention, therefore, is to provide improved fluorescent tracer materials, utilizing fluorescent coordination compounds.

Another object of the invention is to provide fluorescent tracer processes employing fluorescent coordination compounds.

Still another object of the invention is to provide a method of preparing fluorescent tracer materials having improved transparency and color characteristics.

A further object of the invention is to provide improved fluorescent features for use in fluorescent image-forming screens.

A still further object of the invention is to provide improved fluorescent pigment materials.

These and other objects of the invention will in part be obvious and will in part become apparent from the following description thereof when read in conjunction with the accompanying drawings, in which.

Figure 1:
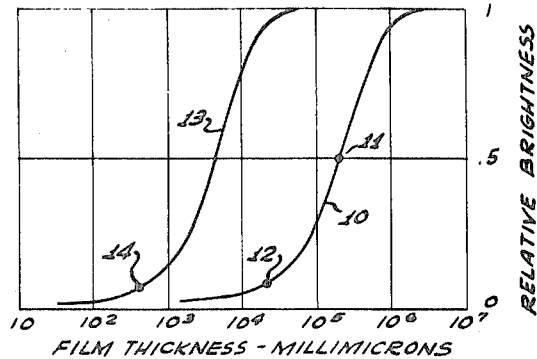
FIG. 1 is a graph illustrating typical fluorescence response transition effects of fluorescent coordination compounds, as used in the method of the invention.

The present invention provides fluorescent tracers, each of which is formulated essentially by the solution in a suitable solvent of a fluorescent metal-organic coordination compound selected from a group to be defined hereinbelow, and at least to a minimum level of concentration, up to a maximum level of concentration, depending on the solubility limit of the coordination compound, as will be described. In order to understand the reason for the set minimum level of concentration, reference should first be made to the concept, which I have formulated, of "thin-film fluorescence:" In accordance with this concept, a fluorescent sensitizer, such as a fluorescent dye or other substance, as, for example, a fluorescent coordination compound in the present instance, when in solution exhibits the characteristic of a threshold of film thickness below which fluorescent coordination compound dissolved in a particular carrier at a particular concentration, there exists a specific film thickness below which there is essentially no fluorescence, and above which there is a fluorescence response. The threshold thickness of the tracer film may be termed the "dimensional sensitivity" of the fluorescent tracer. The concept of thin-film fluorescence is applicable to a fluorescent substance in solution in a solid form, (e.g., as a plastic or resinous material) as well as in liquid form.

For the purpose of measuring the dimensional sensitivity of a fluorescent material in solution, and also of determining the applicable physical constants thereof, I employ a Meniscus-Method, which is described in my U.S. Pat. No. 3,107,298, granted Oct. 15, 1963, for APPARATUS FOR THE MEASUREMENT OF FLUORESCENT TRACER SENSITIVITY. In practicing the invention disclosed in the latter patent, a flat black glass platen is positioned under a black light, and a drop of liquid having dissolved therein, a fluorescent substance is placed on the platen. A convex clear glass lens having a preferred radius of curvature of 106 cm. is then placed over the drop of liquid, and so as to rest on the platen. At the point of contact between the lens and the platen, the liquid film has a thickness of substantially zero, and a meniscus-shaped film surrounds said contact point.

As pointed out in Pat. No. 3,107,298, the thickness of the liquid film varies continuously with the radial distance from the contact point. However, a fluorescence response as seen under black light is distinctly a nonuniform function, so that a nonfluorescent "spot" is seen in the region of the contact point. When the flat platen is made of black glass, the nonfluorescent spot appears as a black spot which contrasts sharply with the so surrounding area of fluorescence, and which can be measured as to its diameter with good accuracy. The diameter of this black spot is used as a measure of the film thickness above which fluorescence response occurs, and below which fluorescence essentially ceases. For a given fluorescent substance dissolved in a particular solvent material, the diameter of the black spot varies depending upon the concentration of the fluorescent substance.

Inasmuch as the transition of fluorescence response, with respect to film thickness, is really a continuous function, the toe of the transition curve approaches zero response as the film thickness if made smaller, but, theoretically at least, never actually reaches zero. As a practical matter, in locating the point corresponding to the so-called dimensional threshold of fluorescence, a point on the transition characteristic curve of the tracer is taken at a film thickness which is one-tenth the film thickness at the midpoint of the transition curve, where the brightness of fluorescence response falls to a value below about 2 percent to 7 percent of the maximum brightness which appears in a relatively thick film of the tracer composition. In the above-mentioned Meniscus-Method test, the diameter of the black spot would be taken as the distance between the points where brightness response begins to rise fairly steeply, at the 2 percent to 7 percent values of maximum brightness brightness, as indicated above. In my copending application, Ser. No. 492,674, I have described in detail procedures for assigning ratings of dimensional sensitivity to solutions of fluorescent substances. Also, I have described methods which are appropriate for assigning ratings of Specific Sensitivity to the fluorescent substances themselves.

Referring now to FIG. 1, there is shown here a graph which illustrates the effect of fluorescence response transition which may be found in a fluorescent sensitizer dye or a fluorescent metal-organic coordination compound, as the case may be. In this graph, the axis of abscissas is set forth on a logarithmic scale in terms of film thickness, and the axis of ordinates is set forth on a linear scale in terms of relative brightness from zero to unity.

When a fluorescent substance is s dissolved in a solvent carrier to a given concentration, and the transition effect is measured by the above-described Meniscus-Method, a fluorescence transition curve is obtained similar to curve 10. The midpoint of this transition curve is shown at point 11, at a value of relative brightness of .5, and the point of dimensional threshold is at point 12, which is at a film thickness one decimal order of magnitude smaller than that at point 11.

When the concentration of the dissolved fluorescent substance is increased, a new transition curve is obtained similar to curve 13, this new curve having essentially the same shape as curve 10, except that it is offset to the left along the axis of abscissas. The dimensional threshold of fluorescence for the new transition curve 13 is now found at point 14. The points of fluorescence threshold 12 and 14 usually fall in the dimensional range from about 20,000 millimicrons down to about 40 millimicrons or less; that is, for useful tracer materials.

In order for fluorescent substance to be useful as a "dye-tracer," it must first be soluble in a suitable solvent carrier. Second, it must be capable of yielding a dimensional sensitivity value smaller than about 20,000 millimicrons. This latter performance requirement for a fluorescent tracer material is, of course, arbitrary, however, practical considerations of tracer performance for the detection of surface flaws by means of inspection penetrants, for example, or for fluorescence detection of thin coatings of tracer-tagged materials require that the dimensional threshold of fluorescence response must be smaller than about 20,000 millimicrons; that is, if the tracer material is to be useful.

In cases where the fluorescent tracer composition is to be used as a fluorescent image-forming screen or a transfer wax for antifraud purposes, it may be necessary to provide a dimensional threshold condition in the tracer composition which is as small or smaller than about 1000 millimicrons, or even 100 millimicrons.

Figure 2:
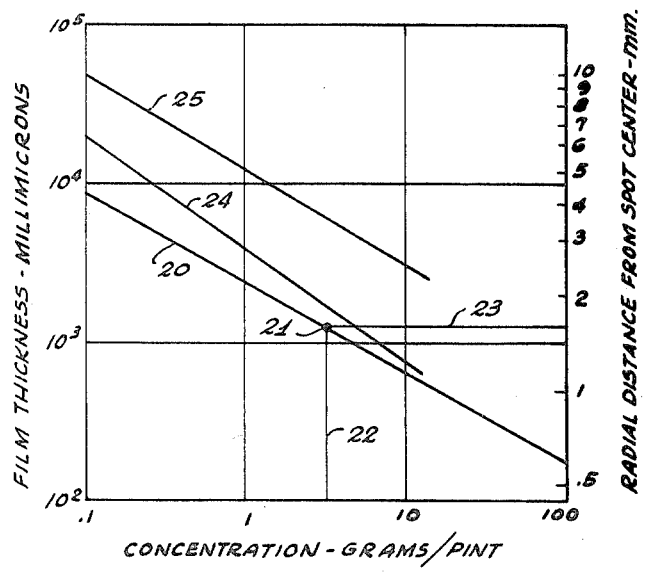
FIG. 2 is a chart employable in conjunction with the use of the fluorescent tracers of the invention, a reading of said chart for a particular tracer being shown.

If the values of dimensional threshold for a fluorescent substance are plotted with respect to various values of dye concentration, then a so-called dilution curve is obtained as shown in FIG. 2. Referring now to FIG. 2, there is here shown a graph in which the axis of abscissas is set forth on a logarithmic scale in terms of concentration of a fluorescent coordination compound, and in which the axis of ordinates is set forth on a logarithmic scale in terms of film thickness or Meniscus-Method spot diameter or radial distance from spot center, as may be desired. The diagonal line 20 is a locus line for dimensional threshold values for a typical fluorescent coordination compound of the invention, a point 21 on this locus line being determined by the intersection of lines 22 and 23, which represent measured values of concentration and film thickness, respectively.

It will be seen from an examination of FIG. 2 that if line 20 represents the locus of dimensional threshold values for a typical fluorescent coordination compound, then in order for the coordination compound substance to provide a useful effect as a tracer indicator, it must be present in solution at a concentration which is greater than about .1 gram per pint. The unit of concentration measure "grams per pint" is used here for the reason that values in grams per pint are numerically equal to pounds per 55 gallon quantity, and thus a convenient translation is permitted from laboratory tests to production quantities of material.

Measurements of dilution characteristics for various of the coordination compounds which are useful in the method of this invention may yield dilution curves corresponding to curves 20, 24, or 25, or other curves in similar locations on the chart. In any event, for a material to be useful as an "inspection tracer," , the concentration of the coordination compound must be greater than about .1 gram per pint, and the dimensional threshold condition thus provided must be smaller than about 20,000 millimicrons. The term "inspection tracer" refers, as indicated above, to compositions containing a dissolved fluorescent ingredient and which yields a fluorescence response in film thicknesses smaller than 20,000 millimicrons.

Figure 3:
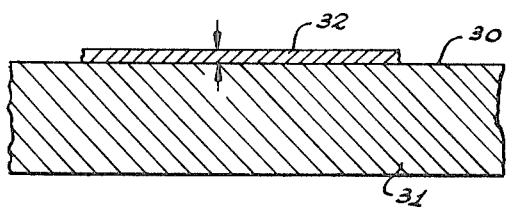
FIG. 3 is a diagrammatic representation of a thin film surface coating illustrating the use of tracer materials of the invention.

Referring now to FIG. 3, a surface 30 of a substrate 31 is coated with a thin film of plastic material 32 which is to act as an electrical insulating layer. For the purpose of this illustration, it is desired teat the thickness of the applied insulating layer shall be smaller than the wavelength of light or 500 millimicrons. At the same time, it may be desired that the presence of this thin insulating layer will be revealed by its fluorescence response. It will be seen, therefore, that if a coordination compound used as a tracer indicator in the plastic material has a dilution characteristic corresponding to curve 20 of FIG. 2, then in order for such a layer to yield a fluorescence response, the concentration of the coordination compound must be greater than about 20 grams per pint.

Again referring to FIG. 3, the layer 32 may be formed by laminating a melted mass of plastic material between two layers of glass, a fluorescent coordination compound being dissolved in the plastic, or the fluorescent coordination compound may be impregnated into the surface of a plastic substrate, thus forming the layer 32. Structures of this nature may be used as fluorescent image-forming screens, as will be described in Example I below.

I have discovered that certain fluorescent metal-organic coordination compounds exhibit unique and useful features with respect to "inspection tracer" behavior. First, though, it should be mentioned that fluorescent coordination compounds have been employed in the past mostly for the purposes of chemical analysis and identification of metals. In such use applications, a given fluorescent coordination compound is formed by a chemical reaction of a metal ion with a so-called "ligand," and the resulting coordination compound is precipitated out of solution, or microscopic quantities of the resultant compound are maintained in dispersion in the liquid, being revealed by their fluorescence response under black light excitation. The extraordinary stability of such precipitates or dispersed compounds serves to yield an extremely high level of sensitivity in the detection of minute quantities of certain metal elements. Metal-organic coordination compounds are sometimes known as metal-organic chelates, or metal-organic complexes.

A number of different metal elements may be used in preparing metal-organic coordination compounds, or complexes, or chelates. Among such metals are: aluminum, barium, beryllium, cadmium, calcium, cerium, dysprosium, erbium, europium, gadolinium, gallium, gold, indium, lutecium, magnesium, niobium, ruthenium, samarium, scandium, strontium, terbium, thorium, vanadium, ytterbium, yttrium, zinc, and zirconium. The fluorescent coordination compounds, as used in the method of the invention, are formed by reaction of a metal ion with an organic ligand, the resulting coordination compound being purified by an appropriate solvent extraction or precipitation, as required.

Among the various useful organic ligands which may be employed are: fluorescent-chelate-forming flavonals, 3-hydroxyflavone (flavonol), 2'3, 4'5, 7-pentahydroxyflavone (Morin), 3,3',4',5,7- pentahydroxyflavone (Quercetin), fluorescent-chelate-forming oxyquinolines, 8-hydroxyquinoline, 2-methyl-8-hydroxyquinoline (8-hydroxyquinaldine), 5-sulfo-8-hydroxyquinoline 5,7-dichloro-8-hydroxyquinoline, fluorescent-chelate-forming anthraquinones, 1-amino-4-hydroxyanthraquinone, fluorescent-chelate-forming salicylidenes, salicylidene-or aminophenol, N-salicylidene-2-amino-3-hydroxyfluorene, salicylidene-o-aminophenol-4-benzol, fluorescent-chelate-forming azobenzenes, 2,2',4-thrihydroxyazobenzene, 2,2' -dihydroxy-4,4' -dichloro-asobenzene, 2,2' -dihydroxyazobenzene, 2, 2' -dihydroxy-1.1' -naphthaleneazobenzene-5-sodium sulfonate, fluorescent-chelate-forming salicylaldehydes, 5-chloro-1-hydroxy- benzaldehyde, salicylaldehyde (o-hydroxybenzaldehyde), fluorescent-chelate-forming beta-diketones, 1-phenyl-1-1, 2-propanedione, 1-pheyl-1,3-butanedione (benzoyl acetone), 1,3-diphenyl-1,3-propanedione (dibenzoyl methane), 4,4,4-trifluoro-1-phenyl-1,3-butanedione, 4,4,4-trifluoro-1-(2-napth (2-naphthyl)-1,3-butanedione, 4,4,4-trifluoro-1-(2-thienyl)-1,3-butanedione, 4,4,4-trifluoro- 1-(2-furyl-1, 3-butanedione, 2,2' -bipyridine, 1,10-phenanthroline, 3-hydroxy-2-naphthoic acid, 5-hydroxy-2-methyl-1,4-pyrone (Kojic acid), and benzoin.

In the above listings of metal elements and ligand materials, it will be understood that not all ligands may be used with each and every one of the listed metals to produce a useful fluorescent coordination compound. However, each ligand listed will form a useful fluorescent coordination compound with at least one of the listed metal elements, and in some cases, a number of the metal elements may be reacted with a given ligand, or a number of different ligands may be reacted with a given metal. For example, aluminum may be reacted with a 2',3,4',5,7-pentahydroxyflavone, 2,2'-dihydroxy-1,1' -naphthal eneazobenzene-5- sodium sulfonate, N-salicylidene-2-amino-3-hydroxyfluorene, 8-hydroxyquinoline, and 3-hydroxy-2-naphthoic acid. Also, 8-hydroxyquinoline may be reacted with zinc, calcium, cadmium, magnesium, and various other metals as well as aluminum, to produce fluorescent coordination compounds. Some of the more useful coordination compounds which exhibit especially unique properties when employed in the method of the invention are: beta-diketone complexes with europium, such as Tris-(4,4,4-trifluoro-1-(2-thienyl)-1,3-butanedione)-europium, and various of the metal celates with 8-hydroxyquinoline. Materials such as these are substantially colorless in ordinary white light and may be used to form brightly fluorescent ultraviolet-responsive transparent image-forming screens.

In many instances in the past, metal-organic coordination compounds have been utilized for their features of insolubility, e.g., their ability to form precipitates. Certain types of coordination compounds, notably the various metal complexes with 8-hydroxyquinoline, are sometimes employed as fluorescent pigments, and are not normally considered to be soluble substances. I have discovered that such materials can be made to s dissolve to relatively high concentrations in certain properly selected solvents. The oxyquinoline complexes, for example, may be dissolved in hot dimethyl formamide or N-methyl pyrrolidone, and they may then be dispersed in acrylic or styrene resins, or in some cases, they may be dissolved directly in a hot plastic melt.

Certain groups of the coordination compounds useful in the method of this invention are soluble in ketones, such as acetone, methyl ethyl ketone, methyl isobutyl ketone, and diacetone alcohol, methyl alcohols, such as methanol, ethanol, isopropanol, butanol, and isodecanol, glycols, such as diethylene glycol, polyethylene glycol, and glycerin, glycol ethers, such as ethylene glycol monoethyl ether, and ethylene glycol monobutyl ether, plastic materials, such as polymerized methyl methacrylate, butyl methacrylate, para-toluene-sulfonamide, cellulose acetate, vinyl plastics, polystyrene, and liquid epoxy resins, waxy materials, such as triphenyl phosphate, carnauba wax, beeswax, and paraffin, and miscellaneous solvent materials, such as nitroethane, dimethyl sulfoxide, ethyl ether, dioctyl phthalate, N-methyl pyrrolidone, methyl cellosolve acetate, tetrahydrofuran, silicone oils, and chlorinated hydrocarbons, such as methylene chloride, trichloroethylene, and perchloroethylene. Many of the materials may also be dissolved in water-insoluble inspection penetrants, water-soluble inspection penetrants, and water-emulsifiable inspection penetrants.

EXAMPLE I

A solution of a coordination compound was prepared as follows, so as to provide a concentration of about 5 grams per pint:

tris-(4,4,4-trifluoro-1-(2-thienyl)-
1,3-butanediono)-europium    .211 gram
dimethyl formamide    20 ml.

The above solution was be colorless in ordinary light, while exhibiting an intense red fluorescence under ultraviolet light. A drop of the solution was measured by use of the Meniscus-Method instrumentation, and it was found that its dimensional threshold of fluorescence was about 900 millimicrons. About 25 grams of polybutyl methacrylate were added to the above composition, and the mixture was heated to dissolve the plastic substance. Heating was continued until all of the dimethyl formamide was driven off by evaporation, leaving a transparent mixture having a faint amber coloration. This plastic melt was allowed to stand at a temperature just above its melting point so as to remove all bubbles, after which a few drops of the plastic melt were placed on a clear glass plate which was warmed on a hot plate to keep the plastic in a fluid condition. A second glass plate was placed over the puddle of fluid plastic mixture, and the two glass plates were gently pressed together so as to form a laminated layer. A water clear and colorless layer of acrylic plastic containing a dissolved fluorescent coordination compound was thus produced. It was found that this clear plate could be used as a an ultraviolet-responsive fluorescent image-forming screen, such that ultraviolet images projected onto the plate would yield intensely fluorescent red images.

The hot melt of resin was extended by the addition of about 450 grams of polybutyl methacrylate to provide a concentration of the europium coordination compound of about .1 gram per pint volume of material, and a dimensional threshold of fluorescence in the range of 20,000 millimicrons. The resulting mixture was cooled to a solid, crushed to a granular consistency, and was then pulverized to a fine powder in a micropulverizer hammer mill. The resulting low-cost powder was found to be an excellent pigment suitable for use in formulating fluorescent red chalks, paints, and dusting powders.

EXAMPLE II

A solution of a coordination compound was prepared as follows:

bis-(8-quinolinolate)-zinc    6 grams
Epoxy Resin (Epon 815, Shell Chemical Co.)    200 grams The above formulation was heated to a temperature of about 275° F., at which temperature the mixture cleared to a translucent solution. A specimen of the fluorescent liquid mixture was examined using the Meniscus-Method instrument, and it was found that the dimensional threshold of fluorescence was in the range of about 1000 millimicrons or less.

The solution was cooled to room temperature, and small test quantities were used as follows to prepare transparent fluorescent image-forming screens. A test quantity of the above fluorescent epoxy resin, in the amount of about 10 milliliters, was placed in a small cup and about 1.25 ml. of diethylenetriamine catalyst was added, the mixture being stirred thoroughly. A few drops of the catalyzed mixture were placed on a clear glass plate, and a cover glass was placed over the puddle of liquid, the two plates being gently pressed together to form a fluorescent laminate layer about .001 inch thick.

The thus-fabricated laminated plate was allowed to cure by polymerization, and the sr resulting structure was found to be practically water-clear and colorless in white light, yet under excitation by projected ultraviolet images it yielded a bright greenish yellow fluorescence.

EXAMPLE III

A fluorescent stamping ink was prepared as follows:
tris-(4,4,4-trifluoro-1-(2-thienyl)-
1,3-butanediono)-europium    1 gram
dimethyl formamide    1 pint A porous rubber stamp pad was saturated with the above solution. It was found that when the thus-prepared stamp pad was used to mark on paper, cloth, or card stock materials, the resulting impressions were colorless and substantially invisible in ordinary white light, while under black light excitation, an intense red fluorescence appeared.

EXAMPLE IV

A series of stamping inks similar to that of Example III were prepared by dissolving the calcium, magnesium, aluminum, and zinc coordination compounds with the 8-hydroxyquinoline ligand in hot dimethyl formamide. In each case, the mixture of coordination compound and solvent was cooled to room temperature and filtered to remove undissolved material, leaving a saturated solution of the fluorescent ingredient. The resulting fluorescent liquid was then used to saturate a porous rubber stamp pad element. The marking impressions from the thus-prepared inks were colorless in white light and appeared brightly fluorescent under black light, providing fluorescent colors ranging from bluish green to greenish yellow.

EXAMPLE V

A fluorescent liquid having the following formulation was prepared:
tris-(4,4,4-trifluoro-1-(2-thienyl)
-1,3-butanediono)-europium    .5 gram
dimethyl formamide    2 oz.
methylene chloride    2 oz.
perchloroethylene    12 oz.

The above liquid formulation was used as a bath for impregnating the fluorescent ingredient into sheets of clear vinyl plastic by a procedure similar to that disclosed in my abovementioned U.S. Pat. No. 3,320,417. A sheet of clear vinyl plastic was dipped into the above fluorescent liquid for about 5 minutes at room temperature. The plastic sheet was removed from the bath and was drained and dried. It was found to be water-clear and colorless in ordinary white light, while under black light excitation, it exhibited an intense red fluorescence. The thus-prepared plastic sheet was suitable for use as a transparent ultraviolet-responsive image-forming screen.

The above-described fluorescent liquid was put in a liquid cell consisting of two glass plates bound together such that they were parallel and spaced about .05 inch apart, and with the edges sealed so as to contain the liquid. This cell and liquid assembly was found to perform as a transparent window. Ultraviolet images projected onto the liquid layer in this window produced an intense red fluorescence response.

EXAMPLE VI

A fluorescent transfer wax was prepared as follows:
triphenyl phosphate    100 grams
carnauba wax    400 grams
tris-(4,4,4-trifluoro-1-(2-thienyl)
-1,3-butanediono)-europium    5 grams The a wax and triphenyl phosphate ingredients were melted in a beaker, and the europium complex was added and dissolved in the melt. The melted mixture was coated onto a paper substrate by a blade-coating method, and it was found that the resulting coating provided a satisfactory transfer mark with the impression of a pencil or a ballpoint pen. A larger batch of the same mixture was prepared and used on a heated printing press in a spot-printing application on signature transfer slips for use by banks for antifraud purposes. The transferred signatures from the signature slips were completely colorless and invisible in ordinary white light, while under black light, they showed as a bright red fluorescence.

Although the invention has been described with reference to particular embodiments thereof, it will be understood that various changes may be made therein, particularly from the standpoint of minor structural modifications of ligand materials, without departing from the spirit of the invention or the scope of the appended claims.

I claim:

1. In an inspection process in which thin films of a fluorescent tracer are revealed by a fluorescence response and wherein a fluorescent tracer is applied to a test surface and said test surface is inspected under black light for the presence or absence of said fluorescent tracer, the improvement being the step of applying onto a test surface a fluorescent tracer comprising the metal-organic coordination compound tris-4,4,4-trifluoro-1-(2-thienyl)-butanediono-europium dissolved in a solvent carrier, said coordination compound being present in said solvent carrier within the range of proportional concentrations from at least about .1 gram per pint up to the limit of solubility of said coordination compound, sufficient to provide a dimensional threshold of fluorescence with an operational value below about 20,000 millimicrons.

2. An inspection process in accordance with claim 1 in which said solvent carrier is at least one member selected from the group consisting of acetone, methylethyl ketone, methyl isobutyl ketone, diacetone alcohol, methanol, ethanol, isopropanol, butanol, isodecanol, diethylene glycol, polyethylene glycol, glycerin, ethylene glycol monoethyl ether, ethylene glycol monobutyl ether, polymerized methyl methacrylate, polymerized butyl methacrylate, para-toluene sulfonamide, polystyrene, liquid epoxy resins, cellulose acetate, vinyl plastics, triphenyl phosophate, carnauba wax, beeswax, paraffin, nitroethane, dimethyl sulfoxide, ethyl ether, dioctyl phthalate, N-methyl pyrrolidone, methyl cellosolve acetate, tetrahydrofuran, silicone oils, methylene chloride, trichloroethylene, perchloroethylene, water-insoluble inspection penetrants, water-soluble inspection penetrants, and water-emulsifiable inspection penetrants.